(12) United States Patent
Il et al.

(10) Patent No.: US 7,323,203 B2
(45) Date of Patent: Jan. 29, 2008

(54) PROCESS FOR PRODUCING PICKLES, AND ANTIMICROBIAL COMPOSITION

(75) Inventors: Shigeo Il, Osaka (JP); Asami Takata, Osaka (JP)

(73) Assignee: Mitsubishi-Kagaku Foods Corporation, Tokyo (JP)

(*) Notice: Subject to any disclaimer, the term of this patent is extended or adjusted under 35 U.S.C. 154(b) by 191 days.

(21) Appl. No.: 10/297,925

(22) PCT Filed: May 25, 2001

(86) PCT No.: PCT/JP01/04399

§ 371 (c)(1),
(2), (4) Date: Dec. 19, 2002

(87) PCT Pub. No.: WO01/97623

PCT Pub. Date: Dec. 27, 2001

(65) Prior Publication Data

US 2003/0185946 A1    Oct. 2, 2003

(30) Foreign Application Priority Data

Jun. 21, 2000  (JP) .............................. 2000-186939
Jan. 11, 2001  (JP) .............................. 2001-004023

(51) Int. Cl.
  *A23L 1/00*  (2006.01)
(52) U.S. Cl. ...................... 426/335; 426/532
(58) Field of Classification Search ................ 426/600, 426/615, 49, 15
  See application file for complete search history.

(56) References Cited

U.S. PATENT DOCUMENTS 5,286,506 A * 2/1994 Millis et al. ................ 426/335
5,703,124 A * 12/1997 Takata et al. ................ 514/514
6,451,365 B1 * 9/2002 King et al. .................. 426/326
6,475,537 B1 * 11/2002 King et al. .................. 424/778

FOREIGN PATENT DOCUMENTS

| JP | 01-207305 | * | 9/1986 |
| JP | 11322521 A | * | 11/1989 |
| JP | 03-232452 | * | 10/1991 |
| JP | 06047272 | * | 2/1994 |
| JP | 06047272 A | * | 2/1994 |
| JP | 06-098738 | | 4/1994 |
| WO | WO99/09842 | | 3/1999 |

OTHER PUBLICATIONS

Lissant, K. 1974. Emulsions and Emulsion Technology, part 1, Marcel Dekker, Inc, New York, p. 264-266.*

* cited by examiner

*Primary Examiner*—Carolyn Paden
(74) *Attorney, Agent, or Firm*—Kratz, Quintos & Hanson, LLP

(57) ABSTRACT

The process for producing pickles of the invention comprises using an oil-in-water antimicrobial composition that contains allyisothiocyanate as the active ingredient and further contains surfactant and water added thereto, in any stage of producing pickles. The invention provides a process for stably producing pickles of good quality while taking suitable measures for surely suppressing the growth of microbes in producing pickles in a simplified manner. The antimicrobial composition of the invention comprises allyl isothiocyanate and a beta acids-containing hop extract as the active ingredients. This is useful as a food freshness-keeping agent free from all the problems with conventional AIT and hop extract each other.

6 Claims, No Drawings

PROCESS FOR PRODUCING PICKLES, AND ANTIMICROBIAL COMPOSITION

TECHNICAL FIELD

The present invention relates to a process for producing pickles, and to an antimicrobial composition useful as a freshness-keeping agent for pickles and other various foods.

BACKGROUND ART

With the recent development of the technology of producing them, pickles are much produced by manufacturers that specialize in pickles production, and the consumption of vegetables to be pickled is now increasing. The yield of vegetables varies depending on the weather and other conditions, and the supply thereof is not all the time stable. Accordingly, for pickles of summer-season vegetables such as cucumbers, etc., Japanese pickles manufacturers import salted vegetables from Southeast Asian countries such as Taiwan and Thailand in which summer-season vegetables can be cropped any time throughout the year, and they produce pickles from the thus-imported salted vegetables. The amount of salt added for salting vegetables varies depending on the type of the vegetables and on the period of time for which the salted vegetables shall be stored, but generally from a viewpoint of preventing the decomposition of vegetables by propagation of microbes and securing preservation stability, the amount of salt is extensive, because a high degree of salinity is needed. Therefore, in the process of producing pickles from such salted vegetables, the salted vegetables must be desalted and desalting them requires a large-scale apparatus and much water.

With the recent increase in health-oriented consumers, the consumption of lightly-salted pickles such as those lightly preserved in salt, for example, those lightly salted overnight rises. Concretely, the output of vegetables lightly preserved in salt now amounts to ⅓ of the overall output of pickles in Japan, but in the production of such lightly-salted pickles, the quality maintenance against microbial degradation is the most serious problem. Microbial degradation of lightly-salted pickles includes rancidity, cloudiness and bag expansion, and these are caused by the propagation of microbes such as lactic acid bacteria and yeast. Accordingly, in production of lightly-salted pickles, it is a matter of importance how to prevent the propagation of such microbes.

On the other hand, in production of lightly-salted pickles, the troublesome lactic acid bacteria and yeast are bearing the important role for brewing peculiar fermentation taste in manufacture of the pickles of others including fermentation pickles. However, if the pickles are too much fermented, their sour taste will be too strong and their smell will change and, as a result, their quality will lower.

As so mentioned hereinabove, microbes must be most optimally controlled in producing pickles, or that is, it is a matter of great importance how to control the activity of microbes in accordance with the type of pickles to be produced. Given that situation, it is desired to provide a method of surely controlling microbes in producing pickles in a simplified manner.

In this connection, it has heretofore been known that allyl isothiocyanate (hereinafter referred to as AIT), one component of wasabi (Japanese horseradish) is highly antimicrobial against colibacillus and yeast, and is therefore useful for a food freshness-keeping agent. However, AIT is an oily liquid that has a peculiar pungent smell and is highly volatile, and is therefore difficult to handle. Accordingly, if AIT is used for antimicrobial purpose in producing pickles, the composition that contains AIT must be highly soluble in water and its use must be simple. JP-A No. 6-192018 discloses an antimicrobial composition that comprises AIT, a polyhydric alcohol and a surfactant, and it says that the composition is used for processing pickles. However, the composition is powdery and is not always satisfactory in point of its solubility in water. In addition, the composition must be metered every time when a desired amount of AIT is dissolved in seasoning for pickles, and therefore, there is still room for improving the handlability of the AIT-containing composition.

For keeping the freshness of pickles and other various foods, AIT alone may have a satisfactory antimicrobial spectrum in some cases and is therefore effective by itself for microbiostatic action in pickles and others, but in some other cases, AIT alone is not satisfactory. Taking the cases into consideration, it is desirable to combine AIT with any other different type of antimicrobial component for enlarging the antimicrobial spectrum.

It is well known from the past that a hop extract has an antimicrobial activity, and it is said that a hop extract gives a peculiar bitter taste to beer and retards the growth of microbes in beer. The antimicrobial activity of the hop extract generally results from the bitter component of hops, alpha acids (humulones) and beta acids (lupulones); and the antimicrobial activity of the beta acids against lactic acid bacteria is higher than that of alpha acids against them. However, the antimicrobial spectrum of the hop extract alone is not always satisfactory.

In consideration of the above-mentioned matters, the present invention is to provide a process for stably producing pickles of good quality while taking suitable measures for surely suppressing the growth of microbes in producing pickles in a simplified manner, and to provide an antimicrobial composition that is useful as a food freshness-keeping agent free from all the problems with conventional AIT and hop extract each other.

DISCLOSURE OF THE INVENTION

The process for producing pickles of the invention that has been attained in consideration of the above-mentioned matters is, characterized in that an oil-in-water antimicrobial composition which contains AIT as the active ingredient and further contains surfactant and water added thereto is used in any stage of producing pickles.

In the aforementioned production process the antimicrobial carposition can further contain a beta acids-containing hop extract as the additional active ingredient.

In a further the production process the hop extract above is obtained through extraction with liquid or critical-state carbon dioxide.

In a further production process the antimicrobial composition above is added to saline water in which vegetables to be salted are dipped.

In a further production process the antimicrobial carposition above is added to seasoning with which vegetables to be pickled are seasoned.

In the production process above, the pickles are lightly-salted pickles.

In the production process the pickles are additionally subdivided into small containers and the antimicrobial composition is added to the pickles before and/or after they are subdivided into small containers.

One antimicrobial composition of the invention contains AIT and a beta acids-containing hop extract as the active ingredients.

In the antimicrobial composition the hop extract is obtained through extraction with liquid or critical-state carbon dioxide.

The antimicrobial composition can further contain surfactant and water, and is in the form of an oil-in-water preparation or a water-in-oil preparation.

The food freshness-keeping agent of the invention comprises the antimicrobial composition.

The method of keeping the freshness of food comprises adding the antimicrobial composition to food.

JP-A No. 6-153882 discloses a combination of an antimicrobial substance extracted and purified from horseradish (this may also be referred to as wasabi radish or Western wasabi), and a hop extract for use as a food preservative. However, the antimicrobial substance described in this patent publication is a crystalline substance that is extracted and purified from horseradish in a state of which a horseradish enzyme is inactivated or its enzymatic activity is blocked, and this substantially differs from AIT that is an oily liquid as in the antimicrobial composition of the present invention. Prior to the present invention, no one knows an antimicrobial composition that comprises a combination of AIT and a hop extract and its use.

BEST MODE OF CARRYING OUT THE INVENTION

The process for producing pickles of the invention is characterized in that an oil-in-water antimicrobial composition which contains AIT as the active ingredient and further contains surfactant and water added thereto is used in any stage of producing pickles. The antimicrobial composition is a liquid preparation that contains a predetermined amount of AIT by itself, and its solubility in water is therefore high. In addition, a predetermined amount of AIT may be readily dissolved in seasonings and others in producing pickles, and therefore it excels in workability.

AIT, the active ingredient of the antimicrobial composition may be any and every one from natural substances and synthetic substances. As the case may be, for example, it may be an AIT-containing essential oil, or an extract or a crude essential oil from wasabi or mustard. However, since it is added to pickles, a type of food, AIT is preferably a natural substance-derived one. In case where AIT is synthesized, the process for synthesizing it is not specifically defined. In general, for example, allyl iodide or bromide is reacted with sodium thiocyanate in ethanol under heat.

The surfactant usable in the invention may be any and every one selected from those having an HLB value of from 1 to 20 in accordance with its use. Typical examples of the surfactant are glycerin fatty acid esters, sucrose fatty acid esters, sorbitan fatty acid esters, propylene glycol fatty acid esters, etc. Fatty acids referred to herein are meant to generically include all fatty acids (straight chain fatty acids, branched chain fatty acids, saturated fatty acids, unsaturated fatty acids), and their examples are palmitic acid, stearic acid, myristic acid, oleic acid and lauric acid. As the case may be, phospholipids such as various lecithins of, for example, soybean lecithin and egg yolk lecithin, as well as hydrogenated phospholipids and sorbitan monooleate polyoxyethylene (e.g., Tween 80-trade name) are also usable as the surfactant herein.

The antimicrobial composition in the form of an oil-in-water preparation that contains AIT as the active ingredient and further contains surfactant and water added thereto is a per-se known preparation and is described, for example, in JP-A Nos. 6-47272 and 6-303952.

The matters to be pickled according to the process of the invention are to be side dishes that are directly eaten as they are, including, for example, cabbage, Chinese cabbage, Nozawa rape, spinach, onion, bean sprouts, butterbur, scallion, garlic, lotus root, Chinese (Japanese) white radish, turnip, carrot, burdock, potato, sweet potato, pumpkin, cucumber, eggplant, gourd, green ume (Japanese apricot), as well as other various fruits, mushrooms, seaweed (hereinafter these are generically referred to as vegetables) as main materials; and these are pickled in various seasonings of, for example, salt, soy sauce, miso (soybean paste), kasu (sake lees), koji (malted rice), vinegar, bran (e.g., rice bran, wheat bran), mustard, moromi (unrefined soy sauce, unrefined miso) and others. The resulting pickles may be ripened and therefore fermented to thereby further enhance their preservation in salt, alcohol or acid; or different from these, some vegetables may be lightly salted and seasoned only overnight, and the preservability of the thus lightly-salted pickles is not so good.

Depending on the seasonings used, pickles are grouped into salted pickles for which the seasoning used consists essentially of salt (e.g., salted scallion, yellow pickled radish, salted ume, salted Nozawa rape); soy sauce pickles for which the seasoning used consists essentially of soy sauce (e.g., sliced vegetables pickled in soy sauce, leaf mustard pickled in soy sauce, Korean pickles); miso pickles for which the seasoning used consists essentially of miso (e.g., edible wild plants pickled in miso, Japanese white radish pickled in miso); kasu pickles for which the seasoning used consists essentially of kasu (e.g., gourd pickles, wasabi preserved in kasu); koji pickles for which the seasoning used consists essentially of koji (e.g., Japanese white radish pickled in sweetened koji, Sagohachi pickles); vinegar pickles having a pH of at most 4.0, for which the seasoning used consists essentially of edible vinegar, ume vinegar or organic acid (e.g., sliced Japanese white radish pickled in vinegar, scallion pickled in vinegar, Japanese white radish pickled in sweetened vinegar); bran pickles for which the seasoning used consists essentially of bran (e.g., Japanese white radish pickled in bran); mustard pickles for which the seasoning used consists essentially of mustard powder (e.g., eggplant pickles in mustard, butterbur pickled in mustard); moromi pickles for which the seasoning used consists essentially of moromi of unrefined soy sauce or unrefined miso (e.g., small eggplant pickled in moromi, cucumber pickled in moromi); and other pickles than the above (including fermented pickles) such as turnip pickles and sauerkrauts.

The antimicrobial composition in the form of an oil-in-water preparation that contains AIT as the active ingredient and further contains surfactant and water added thereto may be used in any stage of producing the pickles in which the pickles being produced must be protected from microbes. For example, the antimicrobial composition preparation may be used in the process as follows: The preparation is dispersed in saline water for salting vegetables or in various seasonings for seasoning them; or the preparation is dispersed in water and the resulting dispersion is sprayed on vegetables to be into pickles; or vegetables to be into pickles are washed with the dispersion. In any of these methods, it is desirable that the AIT concentration in the AIT-containing solution is specifically so controlled as to fall between 1 ppm and 500 ppm in order that AIT is well effective for suppressing the growth of microbes such as colibacillus in the pickles produced and that AIT does not give too much pungent smell and bitter taste peculiar to AIT to the pickles. In case where the antimicrobial composition is added to seasoning for pickles, consumers that take the pickles will also take the seasoning along with the pickles. In that case, therefore, it is desirable that the uppermost limit of the AIT concentration that may be in the seasoning is as low as possible, concretely at most 150 ppm.

For example, in the embodiment of adding the antimicrobial composition to saline water in the process of preserving vegetables in salt, even when the amount of salt added to vegetables is reduced, the propagation of microbes in the salted vegetables is effectively prevented owing to the action of the antimicrobial composition added to the saline water, and, as a result, the salted vegetables enjoy satisfactory preservation stability. Accordingly, the salted vegetables can be readily desalted, not requiring any large-scal apparatus and much water.

In another embodiment of adding the antimicrobial composition to seasoning in which vegetables are lightly pickled, the antimicrobial composition having been previously added to the seasoning surely prevents the degradation of lightly-salted pickles such as rancidity, cloudiness and bag expansion thereof, which are caused by the propagation of microbes such as lactic acid bacteria. In other embodiments of producing pickles, the antimicrobial composition may be added to seasoning in the stage in which the seasoned pickles are fermented moderately, whereby the pickles are prevented from being too much fermented and the fermented pickles are therefore prevented from being degraded. Concretely, for example, the pickles are prevented from turning too sour or from having any offensive smell.

In case where the pickles produced are subdivided into small containers, the antimicrobial composition may be added to them before and/or after they are subdivided into small containers. In this embodiment, the pickles having been subdivided into small containers are prevented from being fermented, or that is, they are prevented from being degraded to turn too sour or to have any offensive smell.

The antimicrobial composition that contains AIT and a beta acids-containing hop extract as the active ingredients is also useful for microbiostatic action in producing pickles. As so mentioned hereinabove, the antimicrobial composition that comprises a combination of AIT and a hop extract and its use are unknown, and the antimicrobial composition of the type is per se novel and constitutes a part of the invention.

In this embodiment, AIT that serves as the active ingredient of the antimicrobial composition may be the same as that mentioned hereinabove.

For obtaining the beta acids-containing hop extract that is another active ingredient of the antimicrobial composition of this embodiment, preferably employed is a method of extraction of hops with liquid or critical-state carbon dioxide. (This method is per se known. If desired, referred to are JP-A Nos. 61-1374 and 6-240288.) According to this method, a hop extract generally containing at least 50% by weight of beta acids (the residue is hop resin or hop essential oil) is efficiently obtained. The extract obtained according to the method is available on the market. For example, one commercially-available product is EHP BASE EXTRACT (trade name) produced by ENGLISH HOP PRODUCTS LIMITED. The method of preparing the beta acids-containing hop extract is not limited to the above-mentioned one. Apart from it, for example, hops may be extracted with cold water or hot water; or they may be extracted with an organic solvent such as ether, ethanol, acetone, chloroform or ethyl acetate; or they may be extracted with an aqueous solution of alkali such as sodium hydroxide, sodium carbonate, ammonium carbonate or sodium phosphate.

The blend ratio of AIT to the beta acids-containing hop extract in the composition preferably falls between 5:1 and 1:1 by weight. Combined in the ratio falling within the range, both AIT and the beta acids-containing hop extract in the composition well exhibit their best ability to suppress the growth of microbes. Another advantage of the composition is that the beta acids-containing hop extract can be dissolved in AIT even in the absence of an organic solvent to thereby give a uniform solution of the antimicrobial composition comprising the two. Since AIT is reactive with ethanol, the use of too much ethanol for the solvent in the antimicrobial composition of the invention is undesirable. The blend ratio of the two active ingredients falling within the range defined as above is enough for the individual ingredients, AIT and beta acids-containing hop extract to well exhibit their best ability to suppress the growth of microbes and is enough for the constitutive ingredients to be formulated into good preparations.

The antimicrobial composition that contains AIT and a beta acids-containing hop extract as the active ingredients may form a uniform solution when the two ingredients therein are in the ratio defined as above, and therefore can be used as a food freshness-keeping agent in any desired preparation form. For better handlability and popularity thereof, it is desirable that the antimicrobial composition further contains surfactant and water to be an oil-in-water preparation or a water-in-oil preparation for practical use.

For the surfactant that may be in the composition, referred to are those mentioned hereinabove.

A method of formulating the antimicrobial composition that contains AIT and a beta acids-containing hop extract as the active ingredients in to an oil-in-water preparation is described below.

For formulating the antimicrobial composition into the intended oil-in-water preparation, from 1 to 100 parts by weight, preferably from 4 to 20 parts by weight of water is added to one part by weight of the composition. The surfactant that may be added to the antimicrobial composition is preferably one having an HLB value of from 8 to 16, and its amount is from 0.01 to 1 parts by weight, preferably from 0.02 to 0.5 parts by weight relative to one part by weight of the composition.

The constitutive components may be mixed and emulsified in any per se known method, for example, in a homogenizer or homomixer.

A method of formulating the antimicrobial composition that contains AIT and a beta acids-containing hop extract as the active ingredients into a water-in-oil preparation is described below.

For formulating the antimicrobial composition into the intended water-in-oil preparation, from 1 to 100 parts by weight, preferably from 4 to 40 parts by weight of water is added to 100 parts by weight of the composition. The surfactant that may be added to the antimicrobial composition is preferably one having an HLB value of from 1 to 4, and its amount is from 1 to 100 parts by weight, preferably from 4 to 40 parts by weight relative to 100 parts by weight of the composition. In case where the antimicrobial composition is formulated into such a water-in-oil preparation, it is desirable that an emulsion stabilizer of, for example, saccharides such as maltose or sorbitol and a thickening agent such as gum arabic or carboxymethyl cellulose are added to the composition. The amount of the saccharide that may be added to the antimicrobial composition may fall between 1 and 100 parts by weight, but preferably between 10 and 50 parts by, weight relative to 100 parts by weight of the composition; and the amount of the thickening agent that may also be added thereto may fall between 0.01 and 10 parts by weight, but preferably between 0.1 and 5 parts by weight relative to 100 parts by weight of the composition.

The constitutive components may be mixed and emulsified in any per se known method, for example, in a homogenizer or homomixer.

The antimicrobial composition that contains AIT and a beta acids-containing hop extract as the active ingredients serves as a food freshness-keeping agent that effectively suppresses the growth of microbes such as lactic acid bacteria and colibacillus in foods, and is used, for example, for pickles such as those mentioned hereinabove, and also for other foods such as everyday dishes essentially made from cereals and vegetables (e.g., foods boiled down in soy sauce); kneaded marine products such as boiled fish pastes, tube-shaped fish paste cakes; delicacies of marine products; processed meat products such as sausages, bacons, hamburgers and meat balls; noodles and various sauces and seasonings.

In particular, in case where the antimicrobial composition of the invention is used in the form of an oil-in-water preparation or a water-in-oil preparation, it maybe used in various methods, for example, by dispersing the preparation in water to form a dispersion, and then the dispersion is added to food materials at a mixing step, sprayed on the foods after heating and shaping, or added to seasonings, or the foods are dipped in the dispersion, or the foods are washed with the dispersion. In those cases, the dispersion is preferably so designed that the AIT concentration and the beta acids-containing hop extract concentration therein each fall between 0.1 and 1000 ppm. If the AIT concentration in the dispersion is lower than the defined range, the dispersion may be ineffective for suppressing the growth of microbes such as colibacillus; but if higher than it, the pungent smell and the bitter taste peculiar to AIT may remain in the foods treated with the dispersion. On the other hand, if the beta acids-containing hop extract concentration is lower than the defined range, the dispersion may be ineffective for suppressing the growth of microbes such as lactic acid bacteria; but if higher than it, the bitter taste peculiar to hops may remain in the foods treated with the dispersion.

For the pickles to which the antimicrobial composition that contains AIT and a beta acids-containing hop extract as the active ingredients is applied while they are produced, referred to are those mentioned hereinabove.

The antimicrobial composition that contains AIT and a beta acids-containing hop extract as the active ingredients may be used in any stage of producing the pickles in which the pickles being produced must be protected from microbes. For example, when the antimicrobial composition is used in the form of an oil-in-water preparation or a water-in-oil preparation thereof, it may be applied to pickles in various methods. Concretely, the preparation is dispersed in saline water for salting vegetables or in various seasonings for seasoning them; or the preparation is dispersed in water and the resulting dispersion is sprayed on vegetables to be into pickles; or vegetables to be into pickles are washed with the dispersion. In any of these methods, the solution containing AIT and a beta acids-containing hop extract is preferably so designed that the AIT concentration and the beta acids-containing hop extract concentration therein each fall between 1 and 500 ppm, in order that AIT in the solution is well effective for suppressing the growth of microbes such as colibacillus in the pickles produced, not giving to the pickles too much pungent smell and bitter taste peculiar to AIT, and in order that the beta acids-containing hop extract is well effective for suppressing the growth of microbes such as lactic acid bacteria in the pickles produced, not giving to the pickles too much bitter taste peculiar to hops. In case where the antimicrobial composition is added to seasoning for pickles, consumers that take the pickles will also take the seasoning along with the pickles. Accordingly, the AIT concentration and the beta acids-containing hop extract concentration in the seasoning are preferably as low as possible. Concretely, it is desirable that the two are at most 150 ppm each.

When the antimicrobial composition that contains AIT and a beta acids-containing hop extract as the active ingredients is used in producing pickles, the beta acids-containing hop extract therein surely acts to suppress the growth of microbes such as lactic acid bacteria while AIT therein also surely acts to suppress the growth of other microbes such as yeast, and therefore the pickles produced are surely prevented from being degraded by microbes such as lactic acid bacteria and yeast. Concretely, for example, the pickles are free from rancidity, cloudiness and bag expansion that may be caused by the propagation of microbes therein. In addition, deterioration of the commercial value of the packaged pickles by the bag expansion based on the fermentation under the anaerobiosis of lactic acid bacteria can be prevented.

EXAMPLE

The invention is described in more detail with reference to the following Examples, which, however, are not intended to restrict the scope of the invention.

Example 1

A. Preparation of AIT-Containing, Oil-in-Water Antimicrobial Composition:

5 parts by weight of mustard oil having an AIT content of 94% by weight, 1 part by weight of purified coconut oil (from Nisshin Oil Mills), 2 parts by weight of commercial soybean lecithin (having a lecithin content of 50% by weight), and 1 part by weight of a surfactant having an HLB value of 15 (sucrose palmitate), Ryoto Sugar Ester P-1570 (trade name by Mitsubishi Kagaku Foods) were emulsified in 91 parts by weight of water with a homogenizer to prepare an oil-in-water emulsion. The emulsion is milky. Even after stored at room temperature for 20 days, no phase separation was seen therein, and the emulsion is extremely stable. One part by weight of the emulsion was added to and suspended in 100 parts by weight of water, and it gave a uniform dispersion.

B. Effect of the Antimicrobial Composition in Producing Pickles:

Scallions were pickled in sweetened vinegar in the following manner. A control seasoning was prepared from 500 ml of edible vinegar having an acid content of 5% by weight, 1400 ml of water, 250 g of sugar, 15 g of salt and 3 g of sodium glutamate. To this added was 0.01% by weight, 0.02% by weight or 0.04% by weight of the antimicrobial composition prepared in the above step A. Salted scallions were desalted in water, and these were pickled in any of these seasonings, divided into small portions, put into styrene containers, and stored at room temperature. These were visually observed with the naked eyes as to whether or not film forming yeast grow in the stored pickles. The results are shown in Table 1. As is obvious from Table 1, even the seasoning having such a low degree of acidity effectively suppressed the growth of film forming yeast in the pickled scallions when the antimicrobial composition was added to the seasoning, and the period for which the pickled scallions are kept fresh is prolonged.

TABLE 1

| Amount of Antimicrobial Composition Added (wt. %) | Growth of film forming yeast | | | | | |
|---|---|---|---|---|---|---|
| | at the start of test | after 7 days | after 14 days | after 28 days | after 42 days | after 56 days |
| 0 | − | − | ± | ++ | +++ | NOT TESTED |
| 0.01[1] | − | − | − | ± | + | +++ |
| 0.02[2] | − | − | − | − | − | ± |
| 0.04[3] | − | − | − | − | − | − |

−: no change;
±: slightly grown;
+: grown;
++: grown in a wide range;
+++: much grown everywhere.
[1]AIT concentration 5 ppm
[2]AIT concentration 10 ppm
[3]AIT concentration 20 ppm Example 2

Antimicrobial Effect of AIT and Beta Acids-Containing Hop Extract

The antimicrobial activity of AIT and beta acids-containing hop extract against *Lactobacillus plantarum, Escherichia Coli, Staphylococcus aureus* and *Hansenula anomala* was investigated in the manner mentioned below. The beta acids-containing hop extract used herein is EHP BASE EXTRACT (trade name) produced by ENGLISH HOP PRODUCTS LIMITED.

(Method)

10 ppm AIT solution (sample A2), 20 ppm AIT solution (sample A3), 40 ppm AIT solution (sample A4) and 80 ppm AIT solution (sample A5) were prepared, each in 0.1% Tween 80 solution. Compared with these, 0 ppm AIT solution (sample Al) was also prepared, and this is 0.1% Tween 80 solution. On the other hand, 5 ppm beta acids-containing hop extract solution (sample H2), 10 ppm hop extract solution (sample H3), 20 ppm hop extract solution (sample H4) and 40 ppm hop extract solution (sample H5) were prepared, each in 0.1% Tween 80 solution. Compared with these, 0 ppm hop extract solution (sample Hl) was prepared, and this is 0.1% Tween 80 solution.

Test tubes each filled with 8 ml of a brain heart infusion broth medium (BHI medium) were sterilized, and a combination Qf any of samples A and any of samples H of 1 ml each was added to every test tube and mixed with the medium therein. With that, 0.1 ml ($10^3$ cfu) of any of different test microbe cell suspensions was inoculated into the medium and incubated therein at 30° C. The incubation time is the optimum growth time for each test microbe, and is as in Table 2. After the cells were thus incubated therein, the turbidity of each medium at 660 nm was measured to evaluate the antimicrobial activity (cell growth inhibition percentage) of AIT and the beta acids-containing hop extract against the test microbes. (For *Hansenula anomala* cells, an YM liquid medium was used in place of the BHI medium.)

TABLE 2

| Microbes | Incubation Time |
|---|---|
| L. plantarum | 24 hours |
| E. coli | 18 hours |
| S. aureus | 18 hours |
| H. anomala | 7 days |

(Result)

Table 3 shows the antimicrobial activity of the antimicrobial composition samples against *Lactobacillus plantarum*. As is obvious from Table 3, sample H4 and sample H5 almost completely suppressed the growth of the cells irrespective of the AIT content of samples A combined with them. On the other hand, the antimicrobial activity of sample H2 and sample H3 increases with the increase in the AIT content of samples A combined with them. This confirms the combined use effect of the combination of samples A and samples H.

TABLE 3

| Cell Growth Inhibition Percentage (%) against *L. plantarum* | | AIT | | | | |
|---|---|---|---|---|---|---|
| | | Sample A1 | Sample A2 | Sample A3 | Sample A4 | Sample A5 |
| Beta Acids-containing Hop Extract | Sample H1 | 0 | 23 | 48 | 42 | 48 |
| | Sample H2 | 34 | 32 | 55 | 57 | 69 |
| | Sample H3 | 83 | 82 | 87 | 89 | 96 |
| | Sample H4 | 97 | 97 | 97 | 97 | 97 |
| | Sample H5 | 99 | 100 | 99 | 99 | 100 |

Against *Escherichia Coli*, the antimicrobial composition samples completely suppressed the growth of the cells so far as the AIT content thereof is not lower than the level of sample A3, irrespective of the beta acids-containing hop extract content of samples H combined with samples A in the composition samples. Against *Staphylococcus aureus*, the antimicrobial composition samples completely suppressed the growth of the cells so far as the AIT content thereof is not lower than the level of sample A4, irrespective of the beta acids-containing hop extract content of samples H combined with samples A in the composition samples. Against *Hansenula anomala*, the antimicrobial composition samples completely suppressed the growth of the cells so far as the AIT content thereof is not lower than the level of sample A2, irrespective of the beta acids-containing hop extract content of samples H combined with samples A in the composition samples.

Example 3

Preparation of Oil-in-Water Antimicrobial Composition that Contains AIT and Beta Acids-Containing Hop Extract 5 parts by weight of AIT, 2.5 parts by weight of beta acids-containing hop extract, and 1 part by weight of a surfactant having an HLB value of 15 (sucrose stearate), Kyoto Sugar Ester 5-1570 (trade name by Mitsubishi Kagaku Foods) were emulsified in 91.5 parts by weight of water with a homogenizer to prepare an oil-in-water emulsion. The emulsion is flesh-colored milky. Even after stored at room temperature for 20 days, no phase separation was seen therein, and the emulsion is extremely stable. One part by weight of the emulsion was added to and suspended in 100 parts by weight of water, and it gave a uniform dispersion.

were put into a polyethylene-aluminium laminate bag, then heat-sealed, and stored at 30° C. Each bag with the noodles therein was checked for expansion. The results are shown in Table 4. As is obvious from Table 4, the antimicrobial composition added to the noodles effectively suppressed the growth of microbes in the noodles and the bags with the noodles therein were prevented from expanding.

TABLE 4

|  |  |  |  | Period of Storage (day) | | | | | | |
|---|---|---|---|---|---|---|---|---|---|---|
|  |  |  |  | 0 | 3 | 5 | 7 | 10 | 14 | 18 |
| Antimicrobial Composition not added |  |  |  | − | ± | + | + | ++ | NOT TESTED | NOT TESTED |
| Amount of Antimicrobial Composition Added | A | B | C |  |  |  |  |  |  |  |
| 0.2 ml | 0.02 | 27 | 13.5 | − | − | − | + | + | ++ | NOT TESTED |
| 0.4 ml | 0.04 | 54 | 27 | − | − | − | − | + | ++ | NOT TESTED |
| 0.6 ml | 0.06 | 81 | 40.5 | − | − | − | − | − | ± | + |

A: Ratio to wheat flour (%)
B: AIT concentration in tap water (ppm)
C: Beta acids-containing hop extract concentration in tap water (ppm)
* −: not expanded,
±: expanded but a little,
+: expanded,
++: much expanded like balloon.

Example 4

Preparation of Water-In-Oil Antimicrobial Composition that Contains MT and Beta Acids-Containing Hop Extract:

33.5 parts by weight of AIT, 16.5 parts by weight of beta acids-containing hop extract, 15 parts by weight of a surfactant having an HLB value of 2 (sucrose palmitate), Ryoto Sugar Ester P-270 (trade name by Mitsubishi Kagaku Foods), 20 parts by weight of an emulsion stabilizer, maltose, and 15 parts by weight of water were mixed and stirred in a homomixer to prepare a water-in-oil emulsion. The emulsion is yellowish milky and creamy. Even after stored at room temperature for 20 days, no phase separation was seen therein, and the emulsion is extremely stable. One part by weight of the emulsion was added to and suspended in 100 parts by weight of water, and it gave a uniform dispersion.

Example 5

Freshness-Keeping Effect for Noodles of Antimicrobial Composition of Example 3

The antimicrobial composition (0.2 ml, 0.4 ml, 0.6 ml) and 10 g of salt were suspended and dissolved in 370 ml of tap water, to which was added 1000 g of wheat flour. This was stirred in a mixer for 20 minutes and then rolled into a sheet of noodle-to-be. This was ripened at room temperature for 2 hours, then further rolled, and thereafter cut into noodles having a width of 3 mm. Thus obtained, the noodles Example 6

Effect of Antimicrobial Composition of Example 3 in Preserving Vegetables in Salt (Preservation of Cucumbers in Salt)

Cucumbers were well washed with water. At room temperature, these were preserved in saline water of different concentrations, of which the weight is the same as that of the cucumbers and which contains the antimicrobial composition of a different concentration. While the cucumbers were preserved therein, the saline water was analyzed for the standard plate count therein by cultivating a sample of the saline water in a standard agar medium (according to the Standard Methods of Analysis in Food Safety Regulation—the same shall apply hereinunder). The results are shown in Table 5. As is obvious from Table 5, even 5% by weight of saline water effectively suppressed the growth of microbes when the antimicrobial composition was added thereto. It is also understood from it that the antimicrobial effect of 10% by weight of saline water that contains 0.2% by weight of the antimicrobial composition added thereto is almost the same as that of 20% by weight of saline water that is generally used for salting preservation of vegetables therein, and that the antimicrobial effect of 10% by weight of saline water that contains 0.4% by weight of the antimicrobial composition added thereto is higher than that of 20% by weight of saline water. The result confirms that adding the antimicrobial composition to saline water significantly reduces the salt content of saline water necessary for salting preservation of vegetables therein.

TABLE 5

| Concentration of Saline Water (wt. %) | Amount of Antimicrobial Composition Added (wt. %) | Standard Plate Count (CFU/g) | | | | |
|---|---|---|---|---|---|---|
| | | at the start of test | after 7 days | after 21 days | after 35 days | after 56 days |
| 5 | 0 | $4.8 \times 10^5$ | $6.5 \times 10^8$ | NOT TESTED | NOT TESTED | NOT TESTED |
| | $0.2^{1)}$ | $4.8 \times 10^5$ | $7.0 \times 10^3$ | $3.5 \times 10^4$ | $8.6 \times 10^5$ | $1.6 \times 10^8$ |
| | $0.4^{2)}$ | $4.8 \times 10^5$ | $3.0 \times 10^2$ | $9.8 \times 10^2$ | $3.3 \times 10^4$ | $4.3 \times 10^5$ |
| 10 | 0 | $4.8 \times 10^5$ | $1.1 \times 10^5$ | $1.5 \times 10^6$ | $2.4 \times 10^7$ | $3.2 \times 10^8$ |
| | 0.2 | $4.8 \times 10^5$ | $7.0 \times 10^2$ | $7.0 \times 10^2$ | $5.6 \times 10^3$ | $8.6 \times 10^4$ |
| | 0.4 | $4.8 \times 10^5$ | $1.4 \times 10^2$ | $2.0 \times 10^2$ | $5.6 \times 10^2$ | $2.3 \times 10^3$ |
| 15 | 0 | $4.8 \times 10^5$ | $3.2 \times 10^4$ | $9.8 \times 10^4$ | $7.3 \times 10^4$ | $6.8 \times 10^4$ |
| | 0.2 | $4.8 \times 10^5$ | $4.5 \times 10^2$ | $5.0 \times 10^2$ | $7.4 \times 10^2$ | $3.2 \times 10^3$ |
| | 0.4 | $4.8 \times 10^5$ | $1.3 \times 10^2$ | $1.7 \times 10^2$ | $6.1 \times 10^2$ | $2.2 \times 10^3$ |
| 20 | 0 | $4.8 \times 10^5$ | $1.4 \times 10^3$ | $8.0 \times 10^4$ | $1.6 \times 10^4$ | $2.3 \times 10^4$ |

[1)]AIT concentration 100 ppm; beta acids-containing hop extract 50 ppm
[2)]AIT concentration 200 ppm; beta acids-containing hop extract 100 ppm Example 7

Effect of Antimicrobial Composition of Example 3 in Pickling Vegetables in Seasoning (Lightly-Salted Cucumbers)

Cucumbers were well washed with water. For 5 hours at room temperature, these were pickled in 5% by weight of saline water of which the weight is the same as that of the cucumbers. This is pre-pickling in saline water. Thus pre-pickled, the cucumbers become flexible. Then, these were pickled in a seasoning liquid (containing 2% by weight of salt and 0.1% by weight of sodium glutamate), of which the weight is the same as that of the cucumbers and which contains the antimicrobial composition of a different concentration. With that, these were put into polyethylene bags, and stored at 10° C. The turbidity, if any, of the seasoning liquid resulting from the growth of microbes in the bags was measured with a calorimeter (OD 660 nm). The results are shown in Table 6. Regarding the turbidity of the seasoning liquid in which the pickles are lightly pickled, it is generally said that the degree of light transmittance of the seasoning liquid must be at least 70% for satisfying the commercial-level requirement of pickles. As is obvious from Table 6, the seasoning liquid could not have a degree of light transmittance of at least 70% on day 4 when no antimicrobial composition is added thereto, but adding the antimicrobial composition to the seasoning liquid has prolonged the period for stable storage of the pickles in accordance with the amount of the composition added thereto. The antimicrobial composition added to the seasoning liquid had no influence on the taste of the pickles produced.

TABLE 6

| Amount of Antimicrobial Composition Added (wt. %) | Light Transmittance (%) | | | | | |
|---|---|---|---|---|---|---|
| | at the start of test | after 3 days | after 4 days | after 5 days | after 6 days | after 7 days |
| 0 | 99.9 | 93.4 | 52.4 | 24.7 | 9.5 | 5.6 |
| $0.05^{1)}$ | 98.7 | 98.5 | 84.1 | 37.7 | 14.0 | 7.5 |
| $0.1^{2)}$ | 98.0 | 98.2 | 97.3 | 82.0 | 42.8 | 19.8 |
| $0.15^{3)}$ | 98.0 | 96.7 | 97.8 | 97.5 | 91.4 | 44.2 |

[1)]AIT concentration 25 ppm, beta acids-containing hop extract 12.5 ppm
[2)]AIT concentration 50 ppm, beta acids-containing hop extract 25 ppm
[3)]AIT concentration 75 ppm, beta acids-containing hop extract 37.5 ppm Example 8

Effect of Antimicrobial Composition of Example 3 in Pickling Vegetables in Seasoning (Lightly-Salted Chinese Cabbages)

Outer leaves were removed from Chinese cabbages, and each cabbage was cut into four and then well washed with water. For 5 hours at room temperature, these were pickled in 5% by weight of saline water of which the weight is the same as that of the chinese cabbages. This is pre-pickling in saline water. Thus pre-pickled, the cabbages were lightly squeezed to remove water, and then pickled in a seasoning liquid (containing 2% by weight of salt and 0.1% by weight of sodium glutamate), of which the weight is the same as that of the cabbages and which contains the antimicrobial composition of a different concentration. With that, these were put into polyethylene bags, and stored at 10° C. The turbidity, if any, of the seasoning liquid resulting from the growth of microbes in the bags was measured with a colorimeter (OD 660 nm). The results are shown in Table 7. In addition, the standard plate count in the seasoning liquid was counted by incubating the seasoning liquid in a standard agar medium. The results are shown in Table 8. Further, the number of lactic acid bacteria in the seasoning liquid was counted by incubating in an MRS agar medium, and the results are shown in Table 9; the number of fungus in the seasoning liquid was counted by incubating in a PDA medium, and the results are shown in Table 10. As is obvious from Tables 7 to 10, adding the antimicrobial composition to the seasoning liquid effectively prevented the turbidity increase of the seasoning liquid and suppressed the growth of microbes therein, and, as a result, the period for stable storage of the pickles in the seasoning liquid is thereby prolonged.

TABLE 7

| Amount of Antimicrobial Composition Added (wt. %) | Light Transmittance (%) | | | | |
|---|---|---|---|---|---|
| | at the start of test | after 3 days | after 5 days | after 7 days | after 10 days |
| 0 | 99.5 | 94.5 | 43.2 | NT | NT |
| $0.05^{1)}$ | 99.4 | 96.8 | 50.7 | 40.0 | NT |

TABLE 7-continued

| Amount of Antimicrobial Composition Added (wt. %) | Light Transmittance (%) | | | | |
|---|---|---|---|---|---|
| | at the start of test | after 3 days | after 5 days | after 7 days | after 10 days |
| 0.1[2] | 99.2 | 97.5 | 85.3 | 47.6 | NT |
| 0.15[3] | 99.3 | 98.0 | 96.3 | 92.3 | 45.2 |

[1] AIT concentration 25 ppm, beta acids-containing hop extract 12.5 ppm
[2] AIT concentration 50 ppm, beta acids-containing hop extract 25 ppm
[3] AIT concentration 75 ppm, beta acids-containing hop extract 37.5 ppm
NT: not tested.

TABLE 8

| Amount of Antimicrobial Composition Added (wt. %) | Standard Plate Count (CFU/g) | | | | |
|---|---|---|---|---|---|
| | at the start of test | after 3 days | after 5 days | after 7 days | after 10 days |
| 0 | $1.4 \times 10^4$ | $6.4 \times 10^6$ | $5.2 \times 10^8$ | $7.3 \times 10^9$ | $6.7 \times 10^9$ |
| 0.05 | $1.4 \times 10^4$ | $8.3 \times 10^5$ | $3.3 \times 10^7$ | $2.5 \times 10^8$ | $7.4 \times 10^9$ |
| 0.1 | $1.4 \times 10^4$ | $5.7 \times 10^4$ | $4.8 \times 10^5$ | $5.4 \times 10^6$ | $3.4 \times 10^8$ |
| 0.15 | $1.4 \times 10^4$ | $9.4 \times 10^3$ | $2.8 \times 10^4$ | $3.7 \times 10^5$ | $7.6 \times 10^7$ |

TABLE 9

| Amount of Antimicrobial Composition Added (wt. %) | Number of lactic acid bacteria (CFU/g) | | | | |
|---|---|---|---|---|---|
| | at the start of test | after 3 days | after 5 days | after 7 days | after 10 days |
| 0 | $3.4 \times 10^4$ | $9.8 \times 10^5$ | $7.2 \times 10^7$ | $2.3 \times 10^9$ | $5.3 \times 10^9$ |
| 0.05 | $3.4 \times 10^4$ | $2.3 \times 10^4$ | $4.5 \times 10^6$ | $7.0 \times 10^8$ | $5.5 \times 10^9$ |
| 0.1 | $3.4 \times 10^4$ | $8.9 \times 10^3$ | $9.7 \times 10^4$ | $7.9 \times 10^5$ | $6.1 \times 10^7$ |
| 0.15 | $3.4 \times 10^4$ | $5.6 \times 10^3$ | $1.6 \times 10^4$ | $9.9 \times 10^4$ | $3.8 \times 10^6$ |

TABLE 10

| Amount of Antimicrobial Composition Added (wt. %) | Number of fungus (CFU/g) | | | | |
|---|---|---|---|---|---|
| | at the start of test | after 3 days | after 5 days | after 7 days | after 10 days |
| 0 | $5.3 \times 10^4$ | $2.2 \times 10^5$ | $6.8 \times 10^6$ | $5.6 \times 10^7$ | $6.6 \times 10^7$ |
| 0.05 | $5.3 \times 10^4$ | $3.8 \times 10^4$ | $2.9 \times 10^5$ | $8.9 \times 10^6$ | $5.3 \times 10^7$ |
| 0.1 | $5.3 \times 10^4$ | $9.9 \times 10^2$ | $6.9 \times 10^3$ | $1.7 \times 10^5$ | $7.4 \times 10^6$ |
| 0.15 | $5.3 \times 10^4$ | $1.5 \times 10^2$ | $3.6 \times 10^2$ | $4.6 \times 10^3$ | $4.8 \times 10^5$ |

Example 9

Effect of Antimicrobial Composition of Example 3 in Subdividing Pickles into Small Containers (Storing Soy Sauce-Seasoned Cucumbers in Small Cups)

Salted cucumbers were well washed with water and cut into pieces. These were desalted by rinsing them in running water for 5 hours. Thus desalted, the cucumbers were well dewatered by centrifuging them, and thereafter seasoned with a seasoning (containing 67% by weight of soy sauce, 0.3% by weight of sodium glutamate, and 0.03% by weight of sodium succinate). Thus seasoned, the cucumbers were divided into small portions and put into commercially-available plastic cups (300 ml in volume, with a lid), whereupon the antimicrobial composition of a different concentration was added to every cup. With the thus-seasoned cucumbers therein, the cups were stored at 15° C. While stored, the cups were observed with the naked eyes as to how film forming yeast grow and how the cups expand. The results are shown in Table 11 and Table 12. As is obvious from Table 11 and Table 12, film forming yeast began to grow on day 4 in the cups with no oil-in-water preparation therein, and on day 7, the cups began to expand. As opposed to these, the cups with the antimicrobial composition therein are free from these troubles, or that is, the antimicrobial composition added to the cups effectively suppressed the growth of microbes in pickles, and the period for stable storage of the pickles in the cups that contain the antimicrobial composition is prolonged.

TABLE 11

| Amount of Antimicrobial Composition Added (ml) | Growth of film forming yeast | | | | | |
|---|---|---|---|---|---|---|
| | at the start of test | after 2 days | after 4 days | after 7 days | after 10 days | after 14 days |
| 0 | − | − | ± | + | ++ | +++ |
| 0.01 | − | − | − | + | + | ++ |
| 0.02 | − | − | − | ± | ± | + |
| 0.04 | − | − | − | − | − | − |

−: no grown;
±: slightly grown;
+: grown;
++: grown in a wide range;
+++: much grown everywhere.

TABLE 12

| Amount of Antimicrobial Composition Added (ml) | Cup Expansion | | | | | |
|---|---|---|---|---|---|---|
| | at the start of test | after 2 days | after 4 days | after 7 days | after 10 days | after 14 days |
| 0 | − | − | − | + | + | + |
| 0.01 | − | − | − | − | + | + |
| 0.02 | − | − | − | − | − | + |
| 0.04 | − | − | − | − | − | − |

− Not expanded.
+ Expanded.

INDUSTRIAL APPLICABILITY

According to the present invention, an oil-in-water antimicrobial composition that contains, as the active ingredient, AIT, highly effective for suppressing the growth of colibacillus and yeast, and further contains surfactant and water added thereto is used in any stage of producing pickles, and the invention provides a process for stably producing pickles of good quality while taking suitable measures for surely suppressing the growth of microbes in producing pickles in a simplified manner, The antimicrobial composition that the invention provides for pickles, contains, as the active ingredients, AIT which is effective for suppressing the growth of colibacillus and yeast, and a beta acids-containing hop extract which is effective for suppressing the growth of lactic acid bacteria.

In the antimicrobial composition of the type, the ratio of AIT to the beta acids-containing hop extract may be suitably controlled, and the beta acids-containing hop extract can be well dissolved in AIT even in the absence of an organic solvent to give a uniform antimicrobial solution. The antimicrobial composition has good stability and provides easily an oil-in-water preparation or a water-in-oil preparation that can be uniformly dispersed in water. The antimicrobial composition of the invention is therefore easy to handle, and is popular, for example, for a food freshness-keeping agent.

The invention claimed is:

1. An antimicrobial composition comprising allyl isothiocyanate and a beta acids-containing hop extract as the active ingredients,
   - wherein the blend ratio of allyl isothiocyanate to the beta acids-containing hop extract is between 5:1 and 1:1 by weight, and
   - the hop extract contains at least 50% by weight of beta acids,
   - which further contains surfactant and water, and is in the form of an oil-in-water preparation.

2. The antimicrobial composition as claimed in claim 1, wherein said hop extract is obtained through extraction with liquid or critical-state carbon dioxide.

3. A food freshness-keeping agent that comprises the antimicrobial composition of claim 1.

4. A method of keeping the freshness of food, which comprises adding the antimicrobial composition of claim 1 to food.

5. The antimicrobial composition as claimed in claim 1, wherein water is in the amount of 1 to 100 parts by weight relative to 1 part by weight of the composition and the surfactant having an HLB value from 8 to 16 is in the amount of 0.01 to 1 part by weight relative to 1 part by weight of the composition.

6. The antimicrobial composition as claimed in claim 1, wherein said surfactant is selected from the group consisting of glycerin fatty acid esters, sucrose fatty acid esters, sorbitan fatty acid esters, propylene glycol fatty acid esters and mixtures thereof.

* * * * *

UNITED STATES PATENT AND TRADEMARK OFFICE
CERTIFICATE OF CORRECTION

PATENT NO. : 7,323,203 B2 Page 1 of 1
APPLICATION NO. : 10/297925
DATED : March 16, 2010
INVENTOR(S) : Shigeo Ii et al.

It is certified that error appears in the above-identified patent and that said Letters Patent is hereby corrected as shown below:

Title page, Item (75) Inventors
change "Shigeo Il" to be -- Shigeo Ii --.

Signed and Sealed this

Thirteenth Day of July, 2010

David J. Kappos
*Director of the United States Patent and Trademark Office*